United States Patent
Youngs

(10) Patent No.: US 7,045,080 B1
(45) Date of Patent: May 16, 2006

(54) INTUMESCENT CERAMIC FIRE RETARDANT COATING CONTAINING INTUMESCENT CERAMIC PARTICLES

(75) Inventor: Roger W. Youngs, Hinsdale, IL (US)

(73) Assignee: Barrier Dynamics LLC, West Dundee, IL (US)

( * ) Notice: Subject to any disclaimer, the term of this patent is extended or adjusted under 35 U.S.C. 154(b) by 0 days.

(21) Appl. No.: 10/891,985

(22) Filed: Jul. 15, 2004

Related U.S. Application Data

(60) Provisional application No. 60/488,650, filed on Jul. 19, 2003.

(51) Int. Cl.
C09K 21/02 (2006.01)
C09D 5/18 (2006.01)

(52) U.S. Cl. .................. 252/606; 106/18.12; 106/18.13
(58) Field of Classification Search ...................... None
See application file for complete search history.

(56) References Cited

U.S. PATENT DOCUMENTS

| | | | | |
|---|---|---|---|---|
| 3,707,385 A | * | 12/1972 | Kraemer et al. | 106/18.11 |
| 4,179,535 A | * | 12/1979 | Kalbskopf et al. | 427/206 |
| 4,297,252 A | * | 10/1981 | Caesar et al. | 252/606 |
| 4,364,210 A | | 12/1982 | Fleming et al. | |
| 4,521,333 A | | 6/1985 | Graham et al. | |
| 4,710,309 A | * | 12/1987 | Miller | 252/62 |
| 5,082,494 A | * | 1/1992 | Crompton | 106/18.12 |
| 5,085,897 A | * | 2/1992 | Luckanuck | 427/427 |
| 5,840,105 A | * | 11/1998 | Helmstetter | 106/18.12 |
| 6,645,278 B1 | * | 11/2003 | Langille et al. | 106/15.05 |
| 2002/0171068 A1 | * | 11/2002 | Erismann et al. | 252/606 |
| 2004/0166246 A1 | * | 8/2004 | Holcomb | 427/440 |

FOREIGN PATENT DOCUMENTS

| | | | |
|---|---|---|---|
| DE | 221184 A1 | * | 4/1985 |
| JP | 53-71134 A | * | 6/1978 |
| WO | WO-00/68337 A1 | * | 11/2000 |

OTHER PUBLICATIONS

USPTO obtained translation of JP-53-71134A.*
USPTO obtained translation of DD-221184A1.*

* cited by examiner

*Primary Examiner*—Matthew A. Thexton
(74) *Attorney, Agent, or Firm*—Neal Gerber & Eisenberg LLP

(57) ABSTRACT

A fire retardant, intumescent, ceramic coating composition comprising an aqueous ceramic intumescent binder, intumescent ceramic particles, mineral fibers and a wetting agent is described. The intumescent ceramic binder comprises a mixture of a liquid alkali metal silicate, mineral fibers and a wetting agent. The coating provides enhanced intumescence and insulative properties suitable for application to structural steel and wood building materials.

11 Claims, 2 Drawing Sheets

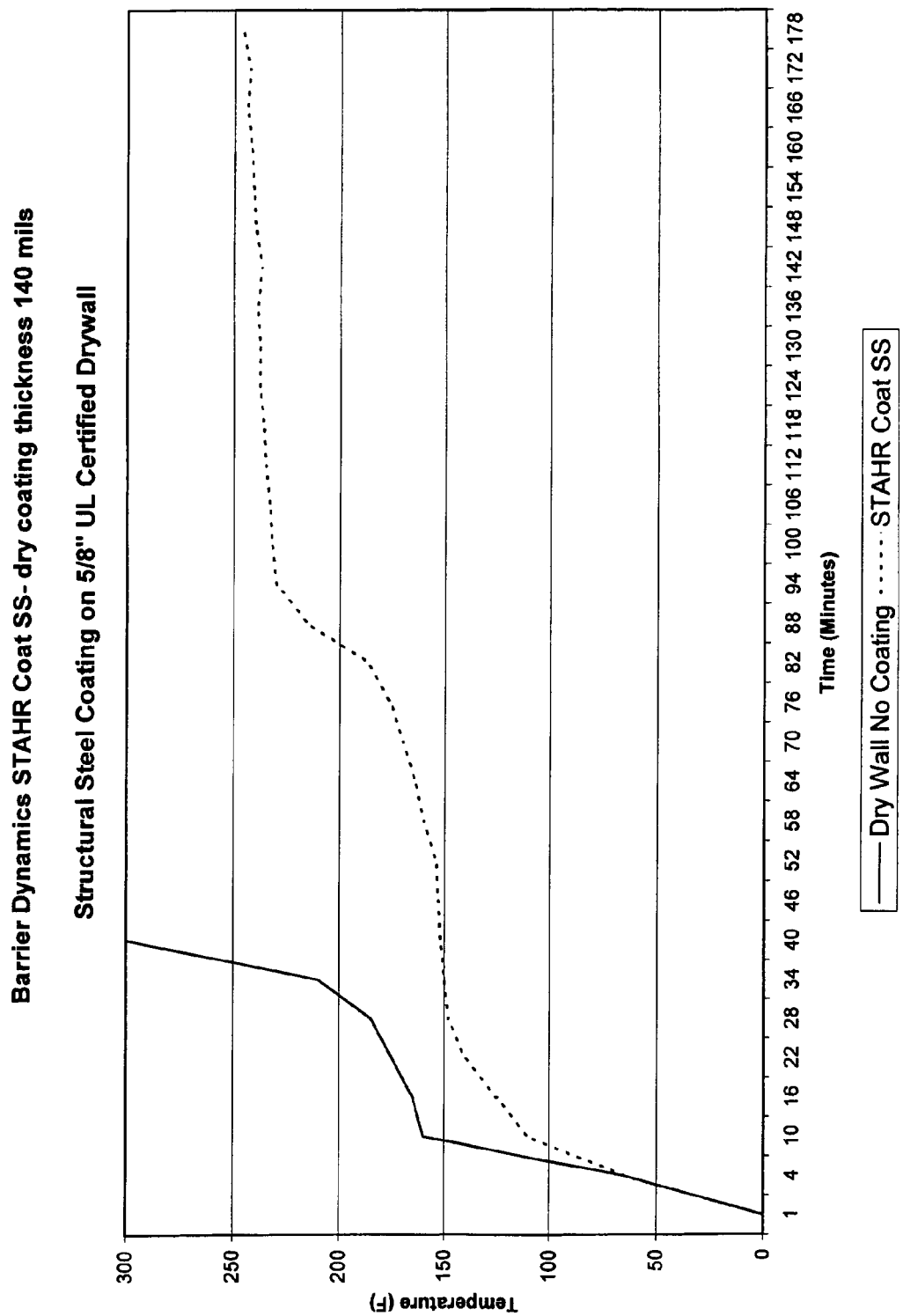

INTUMESCENT CERAMIC FIRE RETARDANT COATING CONTAINING INTUMESCENT CERAMIC PARTICLES

RELATED APPLICATION

This application claims the priority date of U.S. provisional patent application Ser. No. 60/488,650 filed on Jul. 19, 2003.

BACKGROUND OF THE INVENTION

This invention relates generally to intumescent, ceramic silicate fire retardant coatings, which can be used to insulate substrates such as structural steel or wood materials used in buildings to protect the substrates from fires and more specifically, to the intumescent ceramic silicate liquid binder in which is incorporated intumescent, ceramic, silicate particles.

Hydrated metal silicates are known fire-proofing materials and are extensively employed in building construction to insulate apertures and passages in buildings against the passage of fire and smoke. Under the high temperatures existing during a fire, the water of hydration of the metal silicates are driven off causing the composition to expand (intumesce) by up to forty times its original volume forming a foam structure that insulates the building against heat generated by the fire. The foaming pressure of the metal silicate particles helps to seal apertures and passages in building structures making these fireproofing materials useful in fire-stops, as described in U.S. Pat. No. 4,364,210 to Fleming et al., which is hereby incorporated by reference in its entirety. In addition, the preparation of intumescent silicates is described in U.S. Pat. No. 4,521,333 to Graham et al., which is hereby incorporated by reference in its entirety.

SUMMARY OF THE INVENTION

A fire retardant, intumescent, ceramic coating composition comprising an aqueous ceramic intumescent binder, intumescent ceramic particles, mineral fibers and a wetting agent is provided. The intumescent ceramic binder comprises a mixture of a liquid alkali metal silicate, a borate salt, mineral fibers and a wetting agent. The coating provides enhanced intumescence and insulative properties suitable for application to structural steel and wood building materials.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWING

For a better understanding of the invention, reference may be had to preferred embodiments shown in the following drawing in which:

FIG. 2 is a graph depicting the temperature of a piece of drywall, where an intumescent coating has been applied to a front side of the drywall and the front side of the drywall is exposed to a flame temperature of 2000° F., and where the temperature is being taken at a back side of the drywall.

DETAILED DESCRIPTION

Figure 1:
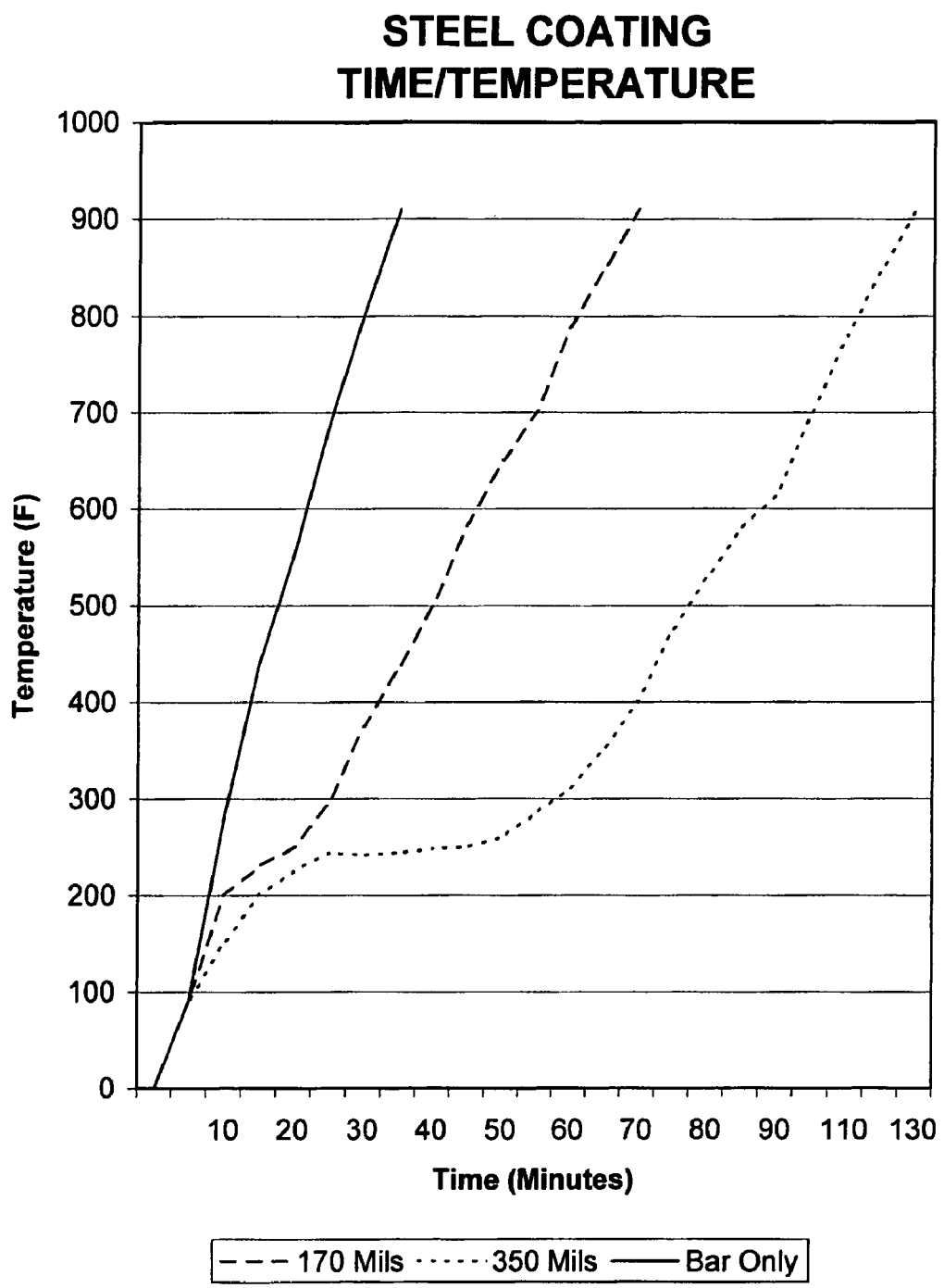
FIG. 1 is a graph depicting the temperature of steel bars, which are exposed to external furnace temperatures of 1800° F. and which having varying thicknesses of an intumescent coating, as a function of time and temperature.

A unique composition has been developed by adding to a water soluble alkali silicate, particles of the same water soluble alkali silicate, which have been combined with a borate compound and then, dried and pulverized into various particle sizes. The composition may be further enhanced by incorporating mineral fibers and a soluble, low foaming, wetting agent. The mineral fibers strengthen the coating and the wetting agent increases adhesion to the metal or wood substrate.

Examples of useful water soluble alkali silicates are sodium silicate, lithium silicate and potassium silicate, however, it is preferred that sodium silicate be used. Sodium silicate has a silica/soda weight ratio of 3.22. It should be understood by those with skill in the art, however, that sodium alkali silicates with different silica/soda weight rations may also be used. These intumescent particles also control the uniformity, stability and height of the intumescence upon exposure to a fire.

Examples of borate compound are borax, calcium borate, magnesium borate and zinc borate, with zinc borate being preferred. Examples of mineral fibers include alkali stable fiberglass, wollastonite and mica. It should also be appreciated that other mineral fibers may be used without departing from the scope of this invention. The preferred wetting agent is sodium 2-ethylhexyl sulfate, but other equivalent wetting agents may also be used.

EXAMPLE 1

A coating was prepared and applied to steel bars for testing in a small lab furnace. The coating was made by first preparing the particles in the following manner. A finely ground zinc borate was added to a first sodium silicate solution with a silica/soda weight ratio of 3.22, the zinc borate comprising about three percent (3%) by weight of the combination of the zinc borate and the first sodium silicate solution. The zinc borate was added with high shear mixing. The compound was mixed for five minutes, spread out in a thin layer on a polyethylene sheet, air dried to a constant weight and pulverized into particles of 500 microns or less. The pulverized particles were added to a second sodium silicate solution with a silica/soda weight ratio of 3.22, the pulverized particles comprising about fifteen percent (15%) by weight of the combination of the pulverized particles and the second silicate solution. The second sodium silicate solution is further comprised of one percent (1%) 2-ethylhexyl sulfate and fifteen percent (15%) wollastonite with an aspect ratio of 15:1 (length to diameter) being preferred. Wollastonite fibers of different aspect ratios may also be used. The coating was mixed for ten minutes then applied at various thicknesses to steel bars containing a thermocouple inserted into the center of the bar. After the coated bars were air dried for two weeks, they were placed in a laboratory furnace and fire tested. FIG. 1 is a graph that compares the performance to two thicknesses of the intumescent ceramic coating to an uncoated steel bar. The failure point at which the steel looses its structural strength is between 950° F. and 1100° F. The graph shows that a coating thickness of 350 mils of the intumescent coating described herein protects the steel from reaching its failure point for over two hours after being subjected to an external furnace temperature of 1800° F.

EXAMPLE 2

A coating was prepared and applied to a piece of drywall (not shown) having a first side and a second side for testing in a small lab furnace. The same coating that was applied to the steel bars in Example 1 was applied to the first side of the drywall. The first side of the drywall was then exposed to a flame temperature of 2000° F., while the temperature of the drywall was measured at the second side of the drywall. FIG. 2 is a graph depicting the temperature of the drywall taken at the second side of the drywall.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A method for preparing an intumescent composition, comprising:
    mixing a finely ground borate compound selected from the group consisting of borax, calcium borate, magnesium borate and zinc borate, with a first sodium silicate solution;
    spreading the mixture in a thin layer;
    drying the mixture to a constant weight;
    pulverizing the mixture into particles; and
    adding the pulverized particles to a second sodium silicate solution.

2. The method for preparing the intumescent composition described in claim 1, wherein the first sodium silicate solution is comprised of an alkali silicate selected from the group consisting of sodium silicate, lithium silicate and potassium silicate.

3. The method for preparing the intumescent composition described in claim 2, wherein the first sodium silicate solution has a silica/soda weight ratio of 3.22.

4. The method for preparing the intumescent composition described in claim 1, wherein zinc borate is mixed with the first sodium silicate solution, the zinc borate comprising 3% by weight of the combination of the zinc borate and the first sodium silicate solution.

5. The method for preparing the intumescent composition described in claim 1, wherein the particles are pulverized to a size of less than 80 mesh.

6. The method for preparing the intumescent composition described in claim 1, wherein the pulverized particles are mixed with the second sodium silicate solution, the pulverized particles comprising about 15% of the combination of the pulverized particles and the second sodium silicate solution.

7. The method for preparing the intumescent composition described in claim 1, wherein the first and second sodium silicate solutions are comprised of the same material.

8. The method for preparing the intumescent composition described in claim 1, wherein the second sodium silicate solution further comprises 1% by weight of 2-ethylhexyl sulfate.

9. The method for preparing the intumescent composition described in claim 1, wherein the second sodium silicate solution further comprises 15% by weight of a mineral fiber selected from the group consisting of alkali stable fiberglass, wollastonite and mica.

10. The method for preparing the intumescent composition described in claim 9, wherein the mineral fiber is wollastonite.

11. The method for preparing the intumescent composition described in claim 10, wherein the wollastonite has an aspect ratio of 15:1.

\* \* \* \* \*